(No Model.)
W. P. ANTHONY.
GEARING FOR VELOCIPEDES.
No. 277,974. Patented May 22, 1883.
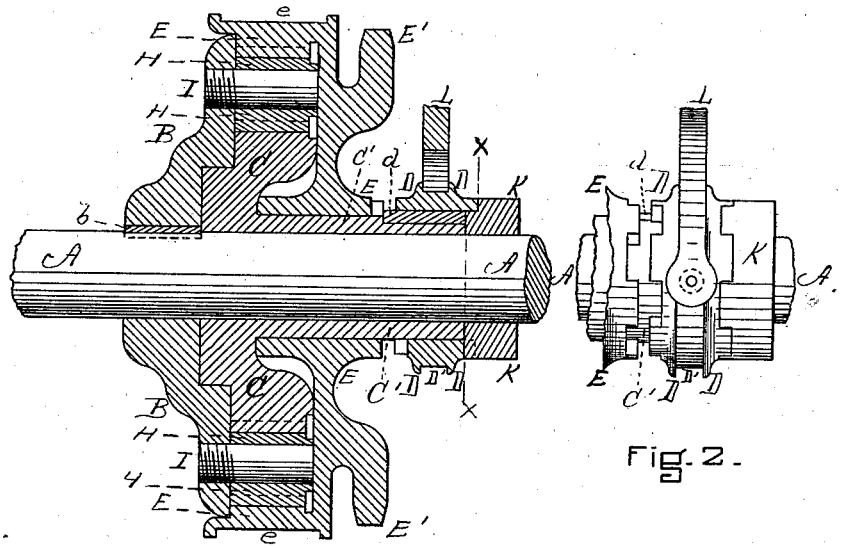
Fig. 1.
Fig. 2.
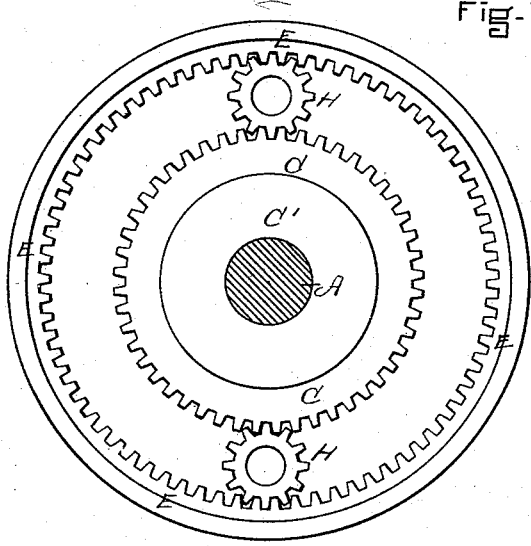
Fig. 3.
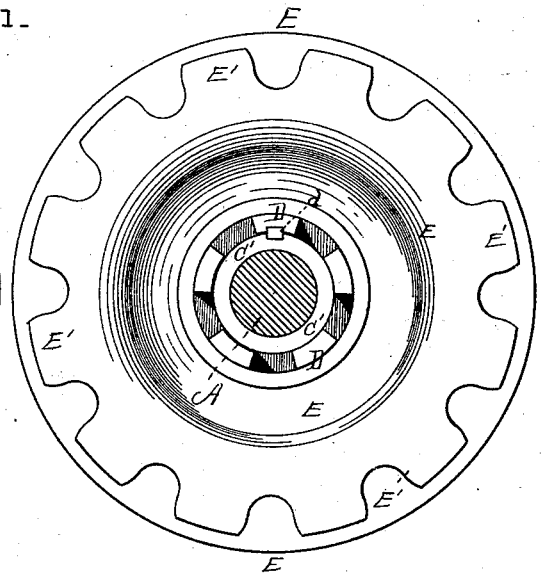
Fig. 4.
WITNESSES
Joseph Ashbaugh
Irving H. Baker
INVENTOR
Wendell P. Anthony
By his Atty.
Henry W. Williams

UNITED STATES PATENT OFFICE.

WENDELL P. ANTHONY, OF PROVIDENCE, RHODE ISLAND.

GEARING FOR VELOCIPEDES.

SPECIFICATION forming part of Letters Patent No. 277,974, dated May 22, 1883.

Application filed March 8, 1883. (No model.)

*To all whom it may concern:*

Be it known that I, WENDELL P. ANTHONY, of Providence, in the county of Providence and State of Rhode Island, have invented a new and Improved Two-Speed Gear for Tricycles and other Velocipedes, of which the following is a specification.

This is an improved gear adapted for velocipedes, and more especially for tricycles, the object of which is to enable the rider to produce either of two different speeds in the driving or pedal shaft, both of which will produce the same speed in the axle and driving wheel or wheels in a simpler and more efficient manner than has heretofore been accomplished— in other words, to gear the tricycle for "power" or for "speed" at the will of the rider, according to the conditions of the road-bed.

In the accompanying drawings, in which similar letters of reference indicate like parts, Figure 1 is a longitudinal section of the device applied to the axle of a tricycle. Fig. 2 is a detailed elevation of certain parts. Fig. 3 is an interior view of the gear-wheels and a section of the axle. Fig. 4 is a section on line $x$, Fig. 1.

A represents the axle, to which are rigidly secured the driving wheel or wheels.

B is a face-plate rigidly secured to the axle A by a spline, $b$, or equivalent mechanical device.

C is a spur-wheel loose on the axle A, and on whose hub C' is keyed, by means of the feather $d$, the clutch D, which is allowed, however, to slip laterally (longitudinally to the axle) on said feather.

E is an internal gear-wheel loose on the hub C' of the spur-wheel C, and adapted, by means of the annular groove $e$, to act as the drum for the brake-band. This groove is not essential to the invention, although in many cases it is advisable to save weight and space to utilize this wheel as a brake-drum. Upon this wheel E are also the sprockets E', which engage the chain which connects the axle A with the driving or pedal shaft for the purpose of communicating power from the latter to the former. The driving-shaft and chain are not shown in the drawings, as they are of the ordinary construction.

H H are pinions or small spur-wheels meshing in the internal teeth of wheel E and the external teeth of wheel C, and placed loosely on the pins I, projecting from the face-plate B.

K is a collar loose on the axle A and rigidly secured to and practically a part of the frame of the tricycle. Both the collar K and the wheel E have, facing the clutch, openings corresponding to the teeth of the clutch, which is provided with the ordinary annular groove, D', and shipping-lever L, extending into said groove.

The operation is as follows: When the clutch D engages with the sprocket-wheel E, the wheel E, clutch D, and face-plate B all rotate with and at the same speed as the axle A and each other, being all locked together. The spur-wheels H do not turn on the pins I, but act as locks. When the clutch D engages with the collar K, the said clutch is held stationary by said collar, and the spur-wheel C is held stationary by the clutch and feather $d$ on the hub C' of said wheel, and the speed communicated to the wheel E by means of the sprockets E' produces a less speed in the face-plate B, and hence in the axle A, to which it is splined, because there is a greater number of teeth on the wheel E than on the wheel C. Hence the small gear-wheels H, by means of the pins I, communicate a reduced speed to the face-plate B. In other words, when the clutch engages the wheel E, the tricycle is "geared for speed;" but when the clutch engages the collar K it is "geared for power," as, in order to produce the same speed in the axle A as when the clutch engages the wheel E, the said wheel E must be driven more rapidly, and hence the driving or pedal shaft must have a greater speed imparted to it.

The pinions H may be one or more in number, and the sprockets E' may be on a separate wheel from the gear-wheel E, but rigidly secured thereto. Of course if the clutch D be placed midway between the collar K and wheel E, engaging with neither, it merely slips on the axle A, and no motion is imparted.

Having thus fully described my invention, what I claim, and desire to secure by Letters Patent, is—

The herein-described improved two-speed gear for tricycles and other velocipedes, consisting, essentially, of the following parts, viz: the face-plate B, fixed to the axle of the driving wheel or wheels and provided with one or more pins, I, the spur-wheel C, loose on said axle, the internal gear and sprocket wheel, E, loose on the hub C' of the wheel C, the pinion H, engaging with the differential wheels C E, the collar K, fixed to the frame of the vehicle, and a clutch adapted to rotate with the wheel C and to engage either with the wheel E or collar K, as desired, all constructed and arranged substantially as and for the purpose set forth.

WENDELL P. ANTHONY.

Witnesses:
HENRY W. WILLIAMS,
JOSEPH ISHBAUGH.